Figure 1:
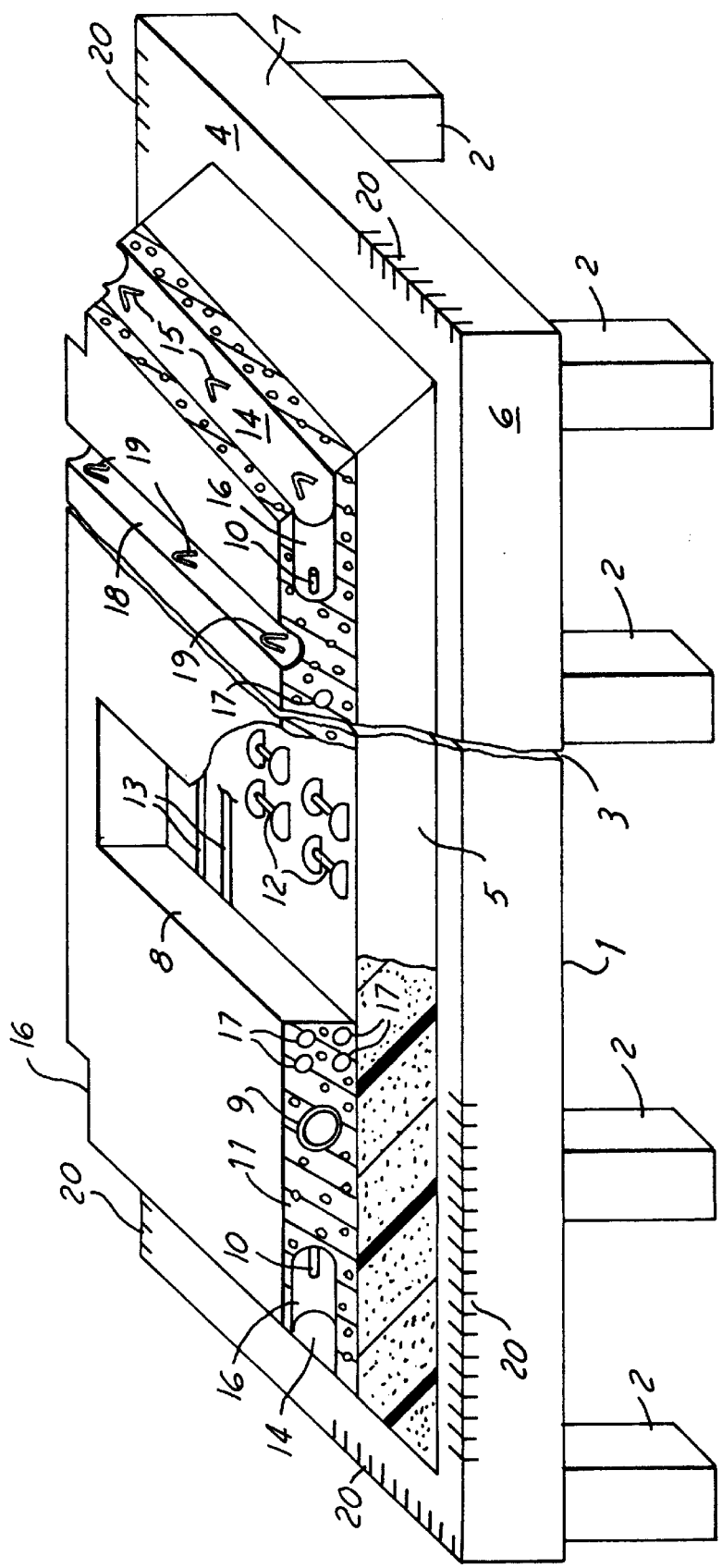

United States Patent [19]
Krecke

[11] Patent Number: 6,083,334
[45] Date of Patent: Jul. 4, 2000

[54] PROCESS FOR THE PRODUCTION OF HEAT INSULATION PANELS FOR LARGE PANEL CONSTRUCTION

[75] Inventor: Edmond D Krecke, Beaufort, Luxembourg

[73] Assignee: Ipa-Isorast International S.A., El Dorado, Panama

[21] Appl. No.: 08/875,960

[22] PCT Filed: Feb. 7, 1996

[86] PCT No.: PCT/EP96/00505

§ 371 Date: Nov. 24, 1997

§ 102(e) Date: Nov. 24, 1997

[87] PCT Pub. No.: WO96/24476

PCT Pub. Date: Aug. 15, 1996

[30] Foreign Application Priority Data

Feb. 9, 1995 [DE] Germany ............................ 195 04 235

[51] Int. Cl.$^7$ .............................. B28B 7/18; B28B 19/00; E04B 2/02

[52] U.S. Cl. ........................... 156/154; 52/79.1; 156/290; 428/223

[58] Field of Search .............................. 156/71, 154, 246, 156/247, 276, 290, 307.1; 428/223; 52/79.1, 79.11, 79.13, 445, 449, 606; 269/303, 904

[56] References Cited

U.S. PATENT DOCUMENTS

| | | | |
|---|---|---|---|
| 2,912,849 | 11/1959 | Wissinger | 52/606 |
| 3,920,369 | 11/1975 | Boehringer et al. | 425/253 |
| 4,272,065 | 6/1981 | Steenson et al. | 269/904 X |
| 4,554,124 | 11/1985 | Sudrabin | 264/263 |
| 4,751,803 | 6/1988 | Zimmerman | 52/414 |
| 4,856,244 | 8/1989 | Clapp | 52/309.7 |
| 4,942,707 | 7/1990 | Huettemann | 52/259 |
| 5,181,825 | 1/1993 | Sugitani et al. | 269/904 X |
| 5,397,228 | 3/1995 | Metten | 425/290 |
| 5,397,516 | 3/1995 | Sikaffy | 264/42 |
| 5,842,314 | 12/1998 | Porter | 52/309.7 |

*Primary Examiner*—Michael W. Ball
*Assistant Examiner*—Jessica Rossi
*Attorney, Agent, or Firm*—Reising, Ethington, Barnes, Kisselle, Learman & McCulloch, P.C.

[57] ABSTRACT

Described is a process for producing heat-insulated panels for the large-scale panel method of construction, which can be used for the production of load-bearing and non-load-bearing walls and supporting walls. The process is characterised in that firstly a hard foam panel (5) is put on to or extruded on to at least one flat table (1), thereafter place-reserving devices in the form of frames or the like for for production of door, window and other openings (8, 14, 16, 18) and inner hollow chambers are put in accurately positioned relationship on to the hard foam panel, then the remaining free surfaces of the hard foam panel (5) are provided with connecting members (12) and preferably fixed by bonding agent and/or preferably undercut grooves are provided in the region of the free surfaces. A concrete layer (11) is then cast and compacted on to the hard foam panel (5) which is provided with an outer boundary means. Finally the concrete layer (11) is stripped off to a precise thickness dimension of the panel over the entire surface area and the surface is smoothed.

28 Claims, 2 Drawing Sheets

PROCESS FOR THE PRODUCTION OF HEAT INSULATION PANELS FOR LARGE PANEL CONSTRUCTION

Large-scale panels have been introduced, for rational building. Usually such panels are made from reinforced concrete in a concrete works and then transported to the site. It is also already know to produce double-shell panels, the intermediate space of which is filled with a heat-insulating material, for example a foam. In that case however problems occur due to corrosion at the connecting bars between the two shells if in winter the temperature falls below the dew point in that region and moisture has an on-going effect. In addition assembly of the known large-scale panels requires a considerable amount of expenditure at the connecting locations between the panels, in particular in the region of corners of buildings and when connecting internal walls.

The object of the present invention is to provide a process with which heat-insulated panels can be produced rationally and with a high degree of accuracy. At the same time the invention seeks to provide that the large-scale panels produced thereby are easy to fit, already include all subsequent openings for doors, windows and the like and as far as possible facilitate the later installation of pipes, conduits and the like. The invention further seeks to provide that a very good heat barrier effect is achieved without heat bridges and without the risks of corrosion.

That object is attained by the process steps recited in claim 1.

The panels which are produced with the process and which can be used for load-bearing and non-load-bearing walls and supporting walls have a good heat barrier effect by virtue of the hard foam panel which is arranged on the subsequent outside of the panels and which can be of great thickness. A secure and also loadable durable connection is achieved between the hard foam panel and the concrete layer cast thereon, by means of the connecting members which are fixed with bonding agent, for example in the form of known connectors in accordance with EP-B-0 299 353 and additionally or also alone in the farm of grooves of an undercut configuration in the hard foam panel. The concrete layer may comprise normal concrete or also a lightweight concrete with air pores or also a fiber-reinforced concrete. A smooth surface with an accurate thickness dimension is obtained by stripping oft or dressing the concrete layer.

Developments of the invention are the subject-matter of the appendant claims. If a high degree of strength of the panels is required, steel reinforcing means of known kind can be applied at a spacing to the hard foam panel, prior to the application of the concrete layer. For that purpose mats or nets can also be used, which are provided with cut-outs for the means for keeping spaces for the production of door, window and other openings. In addition, before the application of the concrete layer, empty tubes and/or installation tubes and/or conduits and/or other installations, for example for solar apparatuses, can be put on to the hard foam plate at a desired spacing.

Advantageously, prior to the application of the concrete layer, perpendicularly and/or horizontally and/or diagonally extending steel bars or tubes may also be applied at a spacing to the hard foam panel, which then after application of the concrete layer before complete hardening thereof are pulled to produce hollow chambers for subsequently inserting reinforcing or sheathing means. Desirably the steel bars or tubes are provided on the outside with a TEFLON® (Polytetraflouroethylene) layer so that they can be easily pulled. Then, on site, reinforcing bars are introduced into the hollow chambers and cast therein with concrete. Besides reinforcing the panels the reinforcing bars may also serve to connect the panels and also to anchor the lowermost panel in a foundation.

A cladding or facing on the outward side of the panels can be produced in a particularly rational fashion by a procedure whereby, prior to the application of the hard foam panel, a material layer is applied to the table surface, which forms the subsequent external cladding or facing of the panel. A bonding agent is applied to that material layer, for connection to the hard foam panel. The material layer any comprise an optionally glass fiber-reinforced synthetic resin coat, a scraper or abrasive coat or also another mineral coat. It is likewise possible to use flat facing members or bricks which are desirably pre-mounted on a glass fiber cloth and provided with an adhesive coat. In all cases, desirably, prior to application of the material layer, a TEFLON® (polytetraflouroethylene) layer, for example in the farm of foils, is applied to the table panel in order later to permit easy separation. The high contact pressure of the concrete which is cast on to the hard foam panel then provides for good adhesion between the material layer and the hard foam.

For the purposes of rational production of an internal cladding of the panels, a further development of the invention can provide that, after the concrete layer is stripped off or dressed, a material layer is applied adhesively to the concrete layer, which forms the subsequent internal cladding of the panel. For that purpose it is possible to use an optionally fiber-reinforced smoothing mass based on cement or cellulose, which can be painted or hung with paper and which receives its future surface structure in the form of a rough-fiber or glass-fiber wallpaper with for example a fishbone or herring-bone pattern, by means of embossing rollers. It is likewise also possible for formaldehyde-tree and water-resistant chipboard panels to be applied by way of bonding agents to the concrete surface in order to provide a wall surface on which paper can be hung. There is also the possibility of using a structure mat which gives the surface a structure pattern and which can be later dressed off. At the same time it is also possible for paints to be applied as the final treatment. The material layer can desirably be produced by machine by means of a silo passing over the entire table width, with an adjustable slit-type nozzle, wherein charging of the silo is effected, preferably from above, by means of a positive-action mixer, under the force of gravity.

If the panels are to he fitted together in matching relationship at a corner of a building and without subsequent dressing for adjustment thereof, desirably the side edges inclusive of the bard foam panel and the concrete layer and possibly the material layers for the external and internal cladding are provided with a bevel which extends inwardly at 45°. The corner panels then tit accurately together without a gap. Advantageously in that respect the concrete layer is provided in the region of the bevel with an opening of semicircular configuration in cross-section, in the form of a channel which extends parallel to the side edges and into which eyes or loops of the reinforcing means project. After the corner panels are fitted together, they can then be securely connected by inserting a reinforcing bar into the eyes or loops. The hollow chamber formed by the two channels, with the eyes and reinforcing means, is then cast with concrete.

When fitting installation tubas and conduits on to the hard foam plate prior to the operation of casting the concrete thereon, means for keeping spaces for producing installation and/or inspection troughs may desirably be provided in the region of the tube and conduit ends, on the top side and/or underside of the panel. At a later time, after the panels have been erected, connections can then be made and checked in the inspection troughs, While the large-scale panels according to the invention are provided on the outward side with a thermal insulation in the form of the hard foam panel, intermediate walls in the interior of the building generally do not need to be heat-insulated. In order however to facilitate the connection of such panels without thermal insulation to the external wall panels, a development of the invention provides that the top side of the concrete layer is provided with a groove extending parallel to the side surfaces. Intermediate wail panels can then be fitted into such grooves. Once again the grooves desirably include eyes or loops which co-operate with corresponding eyes or loops on the lateral outside edges of the intermediate wall panels and permit a secure fixing effect to be achieved after the insertion of a reinforcing bar. The grooves can then be filled with concrete cast therein.

Rational production of panels in accordance with the invention can be made possible by a plurality of tables being arranged in parallel juxtaposed relationship so that a plurality of panels can be produced at the same time.

The hard foam panels can be applied in prefabricated form to the table or tables. In a development of the invention however there is also the possibility of applying the hard foam panels by means of an extruder with an adjustable wide slit-type nozzle. When dealing with a plurality of tables arranged in juxtaposed relationship, the hard foam panels cam be extruded in succession for all tables.

The table surface is desirably of a rectangular configuration, of a length of for example between 12 and 18 m and a width of for example about 4 m. Scale subdivisions may be disposed at the edges, which permit precise positioning of means for keeping spaces available, and other parts, as well as the outer edge boundaries. The scale subdivisions can additionally be in the form of retaining means for gauges or patterns or such retaining means may be provided in addition.

For construction with panels in accordance with the invention, without gaps and with the highest possible degree of accuracy, it is very important for the panels to be very true to size. Here, a development of the invention provides that, aster setting of the concrete layer and possibly the internal and external cladding layers, the side surfaces of the panel are milled over the entire height to a precise longitudinal dimension of the panel and at the same time to an accurate angle measurement of 90° or 45°. In the event of simultaneous production of a plurality of panels in mutually superposed relationship, the milling operation can be effected simultaneously for all panels. Desirably, two milling tools are used for that purpose for the two side surfaces, with the milling tools being set precisely to the correct spacing and the correct angle.

In accordance with a development of the invention, to produce a plurality of panels on a table, after at least partial solidification of the concrete layer and possibly the internal and external cladding layers, the process in accordance with the foregoing description can be repeated, in which case it is now not the table surface but the concrete layer or the internal cladding layer of the finished panel that serves as a mounting surface for a further panel. That can then in turn be used as a mounting surface for a third panel, and so forth. To separate The panels, a foil can be laid on the concrete layer or the internal cladding layer of the respective bottom panel. If the panels which are disposed one upon the other are each provided with a bevel which extends inwardly at 45°, the respectively stacked panels can be of shorter dimensions, in such a way that the side surfaces of all panels which are disposed one upon the other can be jointly milled to a precise longitudinal dimension and an accurate angle of 45°.

If the panels according to the invention, after manufacture thereof, are moved out of the horizontal position on the table surface into a vertical position which is required for transportation, intermediate storage and fitting, then normally, when dealing with th very large panels, there is a risk of damage due to cracking or twisting or distortion. To avoid such damage, a development of the invention provides that the table or tables is or are pivotable in such a way that the panels with support over their entire surface area can be moved into the vertical position. The pivotal movement of the tables can be affected mechanically or also hydraulically.

To dry the manufactured tables as satisfactorily as possible and to accelerate the setting effect, it can be provided that th table surface is heatable. The hard foam panel admittedly provides for a thermal insulation effect, but nonetheless there is a sufficient transfer of heat to the concrete layer. In production of panels without thermal insulation for internal walls, a particularly rapid setting effect can then be achieved. Good compacting of the concrete layer can be achieved by the table being in the form of a shaker or jarring table.

A particularly advantageous development provides in that respect that, prior to the application of the hard foam panel and possibly the internal cladding layer, an L-shaped assembly support or stand is put onto the table or each table if more than one table is used. In that situation, the long limb surface of the assembly support or stand, with its outward side, covers the table surface, end with its inward side forms the mounting surface for the layers of the panels. The short limb surface of the assembly support or stand forms an abutment and mounting surface for the future underside of the panels. The assembly supports or stands can be made for example from steel sheet or steel profiles. After the pivotal movement of the table or tables into the vertical position, the finished panels then stand an the short limb of the assembly supports or stands and can be transported, together with them. For that purpose the assembly supports or stands desirably have at their upper edge of the long limb surface, holding devices in the form for example of eyes for a crone. In that connection, the holding devices may be so disposed and of such a configuration that the assembly supports or stands with the panels hang slightly inclinedly so that the panels lean against the long limb surface. In that position the panels can then also for example be put on a truck. For that purpose the underside of the short limb surface desirably has support elements which are wedge-shaped in cross-section, in such a way that the assembly support or stand stands in an inclined position such that the panel or panels bear against the long limb surface.

Figure 2:
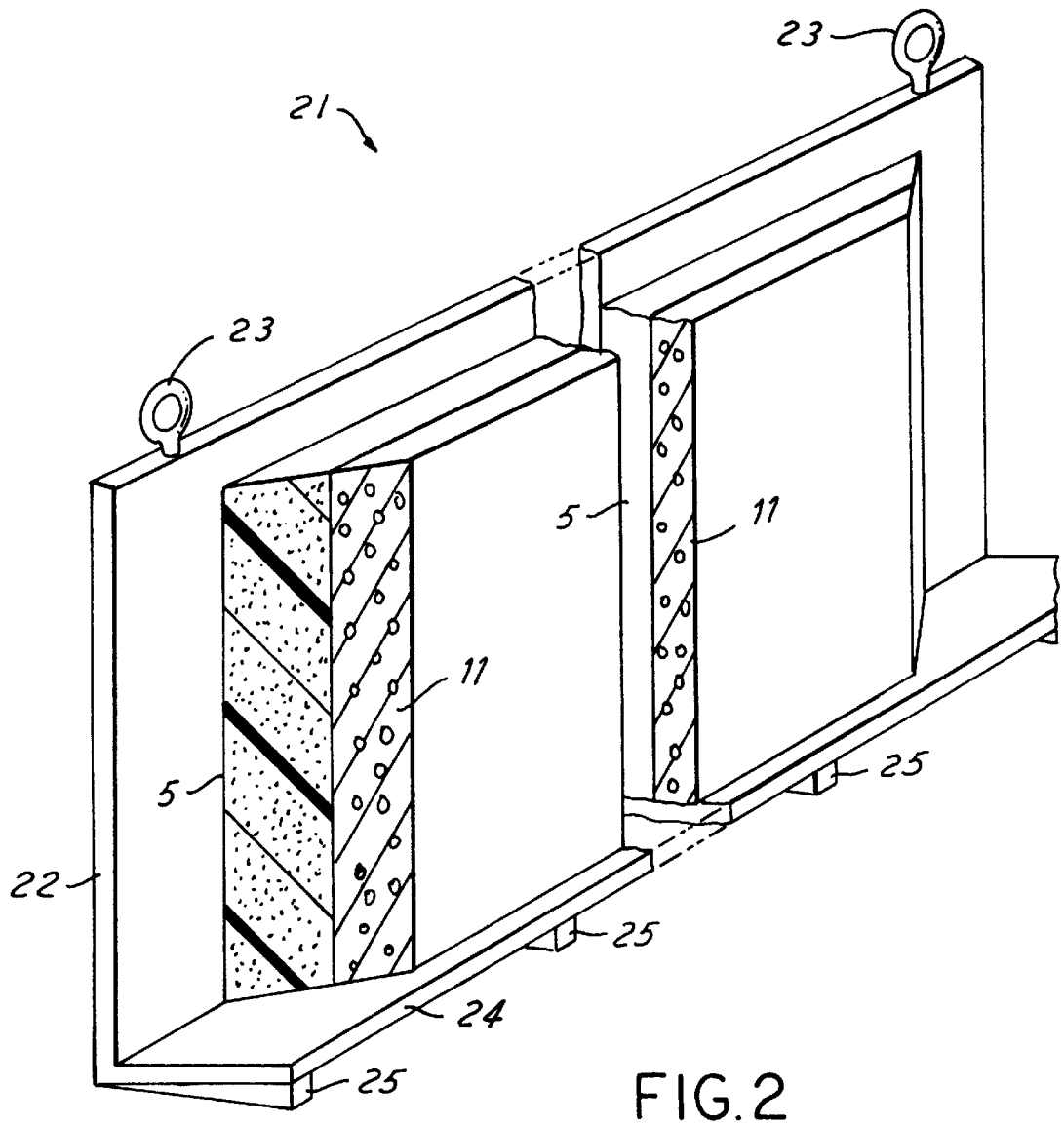

The process according to the invention will be described hereinafter by means of an embodiment with reference to the drawings in which:

FIG. 1 shows a table for carrying the process into effect, with a partly sectioned and cut-away large-scale panel, and FIG. 2 shows a large-scale panel standing on an L-shaped assembly support or stand, in a vertical position.

FIG. 1 diagrammetically shows a table 1 with legs 2 for carrying cut the process according to the invention. The table may be for example 18 m in length and 4 m in width. To simplify the drawing, the table 1 it shown as being shortened in terms of its length, as indicated by the breakage line 3. A hard foam panel 5 is put on to the table surface 4. The panel 5 can either be prefabricated or it can be extruded on to the surface 4 by means of an extruder (not shown) with n wide slit-type nozzle, A more rational mode of manufacture can be achieved if a plurality of tables 1 are disposed together with their longitudinal sides 6 or also their end sides 7. Then a hard foam panel 5 can be successively extruded on to all table surfaces 4.

After application of the hard foam panel 5, devices (not shown for keeping spaces, in the form of frames or the like, for producing door, window and other openings, and possibly also inner hollow chambers, are put on to the hard foam panel 5. Such a door opening is identified by reference 8. In addition empty and installation tubes 9 as well as conduits, the ends of which are identified by 10, can be put on to the assembly. Prior to the operation of casting a concrete layer 11 on to the hard foam panel 5, connecting members 12 are put on to the hard foam panel 5, by means of bonding agent. In the illustrated embodiment the connecting members 12 comprise dumbbell-shaped connectors which are divided on the longitudinal center, consisting of concrete, in accordance with EPB-0 299 353, so that they are connected to the concrete layer 11 cast thereon and ensure that the hard foam panel 5 and the concrete layer 11 are firmly held together. An additional improvement is achieved br means of grooves 13 of undercut, trapezoidal cross-section (not shown). The concrete of the layer 11, which is cast on the hard foam panel, penetrates into the grooves 13 and also improves the interconnection between the panel 5 and the layer 11. Only two grooves 13 are shown to simplify the drawing. In practice however the grooves are disposed on the entire surface area of the hard foam panel 5. A corresponding consideration applies for the connecting members 12.

The hard foam panel 5 and the concrete layer 11 are provided at both ends with a 45° bevel which extends upwardly in the drawing. In that way the large-sale panels can be fitted together directly and without a gap at a corner of a building. To connect the two mutually butting panels, the concrete layer 11 is provided with a channel 14 of semicircular configuration in cross-section, by laying a suitable device for keeping a space in the layer, prior to the operation of casting same. Eyes or loops 15 of a reinforcing means which is laid into the concrete layer 11 project into the channel 14. After two panels are brought together at a corner of a building a reinforcing bar (not shown) can then be fitted through the eyes 15 of the two panels, thereby producing a secure connection. Concrete is then cast in the circular hollow cavity formed by the two co-operating channels 14.

In order to permit connection of the conduit ends 10 and also other installations and subsequent inspection and repair operations, troughs 16 are produced in the region of the conduit ends 10 and at the corners of the panel, by using suitable devices which are disposed thereon for keeping the appropriate spaces open.

So that it is subsequently possible on site to fit additional reinforcing means which reinforce the panel in certain regions, for example in the proximity of a door opening 8, and to permit the mutual connection of panels and anchorage thereof in the foundation, there are provided tubular cavities 17 which in the illustrated embodiment extend in the vertical direction of the penal. The cavities 17 are produced by laying TEFLON® (polytetraflouroethlyene) coated steel bars in positioned relationship on the hard foam panel 5. After the concrete layer 11 has been cast in place and prior to complete hardening thereof, the steel bars are then pulled, and the cavities are left behind.

In the finished building the concrete layer 11 forms the inward side and the hard foam panel 5 forms the outward side. Intermediate walls (not shown) can be connected with an erected panel in a simple and reliable fashion by virtue of the provision of a semicircular groove 18 which extends parallel to the end Surfaces and into which loops or eyes 19 of the reinforcing means again project. An internal wall can then be fixed in the groove 18 in the same manner as in the case of a corner connection between panels by means of the eyes 15.

At its side and end edges 6, 7 the table 1 has scale subdivisions which by means of gauges (not shown) permit very precise positioning of the individual panel elements. The scale subdivisions can at the same time represent retaining locations.

After a panel is finished the panel has to be moved into the vertical position for transportation, possibly intermediate storage and for later assembly. That can be effected by pivoting the table 1 with for example a hydraulic piece of equipment. Subsequent transportation and intermediate storage of panels is substantially improved and facilitated if, before the application of the hard foam panel 5, an L-shaped assembly support 21 is put on to the table surface 4, with its long limb surface 22, we shown in FIG. 2. After a panel is finished the assembly support 21 can then be pivoted into the vertical position, instead of the entire table 1. For that purpose the assembly support 21 has eyes 23 for hanging crane hooks therein. The finished panels then stand on wedge-shaped support elements 25 which are arranged beneath the short limb surface 24 in such a way that the assembly support 21 stands slightly inclinedly and in that situation the panel 5, 11 leans against the long limb surface 22. In that slightly inclined position the assembly supports which desirably stand in back-to-back relationship, with the panels carried thereon, can be transported and put into intermediate storage, without any danger.

What is claimed is:

1. A process for producing heat-insulated panels for the large-scale panel method of construction, comprising the following process steps:

a) applying a hard foam panel to at least one flat table;

b) disposing devices for reserving places in the form of frames for the production of openings and inner hollow chambers in accurately positioned relationship on the hard foam panel;

c) spaced apart connecting members fixed by bonding agent to the remaining free surfaces of the hard foam panel;

d) pouring and compacting a concrete layer on to the hard foam panel; and e) stripping off the concrete layer to an accurate thickness dimension of the panel over the entire surface area and smoothing the surface.

2. A process as set forth in claim 1 wherein prior to step d) steel reinforcing means are provided on to the hard foam panel.

3. A process as set forth in claim 1 wherein prior to process step d) one or more of installation tubes and conduits and other installations are laid at a desired spacing on to the hard foam panel.

4. A process as set forth in claim 1, wherein prior to process step d) coated steel bars are laid on to the hard foam panel and after step d) prior to complete hardening of the concrete layer, said steel bars are pulled from the concrete layer for the production of hollow chambers for the subsequent insertion of reinforcing means.

5. A process as set forth in claim 1 wherein prior to process step a) a material layer is applied to the table surface, which layer forms the subsequent external facing of the hard foam panel, and a bonding agent layer for connection to the hard foam panel is applied to the material layer.

6. A process as set forth in claim 1, wherein after process step e) a material layer is adhesively applied to the concrete layer, said material layer forming the subsequent internal cladding of the panel.

7. A process as set forth in claim 6 wherein to produce a plurality of panels on a table after at least partial solidification of the concrete layer, the process is repeated with the internal cladding layer as the assembly surface.

8. A process as set forth in claim 1 wherein a plurality of tables are arranged in parallel juxtaposed relationship to produce a plurality of panels.

9. A process as set forth in claim 8 wherein the hard foam panel is applied by means of an extruder with an adjustable wide slit nozzle.

10. A process as set forth in claim 1 wherein the side edges of the panel inclusive of the hard foam panel and the concrete layer are provided with a bevel extending inwardly at 45°.

11. A process as set forth in claim 10 wherein in the region of the bevel, the concrete layer is provided with an opening of generally semicircular cross-section in the form of a channel which extends parallel to the side edges and is adapted to receive eyes of a reinforcing means.

12. A process as set forth in claim 1 wherein in process step b) place-reserving devices for the production of one of installation and inspection troughs are provided in the region of the conduit ends at one of the top side and underside of the panel.

13. A process as set forth in claim 1 wherein a top side of the concrete layer is provided with a groove extending parallel to the side surfaces, for binding in an intermediate wall.

14. A process as set forth in claim 13 wherein the groove is adapted and arranged to receive eyes of a reinforcing means.

15. A process as set forth in claim 1 wherein the table surface is rectangular and is provided at its edges with scale subdivisions.

16. A process as set forth in claim 15 wherein the scale subdivisions are in the form of retaining means.

17. A process as set forth in claim 1 wherein after setting of the concrete layer the side surfaces of the panel are milled over the entire height of the panel to an accurate longitudinal dimension and at the same time to an accurate angle of one of 90° and 45°.

18. A process as set forth in claim 1 wherein to produce a plurality of panels on a table after at least partial solidification of the concrete layer the process is repeated with the concrete layer as the assembly surface.

19. A process as set forth in claim 1 wherein the table is adapted to be pivotable in such a way that the table may be moved out of the horizontal into the vertical position.

20. A process as set forth in claim 1 wherein the table surface is heatable.

21. A process as set forth in claim 1 wherein the table is in the form of a shaker table.

22. A process as set forth in claim 1 wherein prior to application of the hard foam panel an L-shaped assembly support is put on to the table, a long limb surface of an assembly support is provided with its outward side covering the table surface and with its inward side forming the assembly surface for the layers of the panel, while a short limb surface of the assembly support is also provided to form an abutment and support surface for the underside of the panel.

23. A process as set forth in claim 22 wherein the assembly support is provided at an upper edge of the long limb surface with holding devices for a crane.

24. A process as set forth in claim 22 wherein provided on the underside of the short limb surface are support elements of wedge-shaped cross-section, in such a way that the assembly support stands inclinedly such that the panel or panels bear against the long limb surface.

25. A process as set forth in claim 1 wherein the step of applying the connecting members is accomplished by forming undercut grooves in the hard foam panel which are adapted to be filled by concrete from the concrete layer.

26. The process as set forth in claim 1 wherein the step of applying the connecting members is accomplished by fixing dumbbell-shaped members to and protruding from the foam panel.

27. A process for producing heat-insulated panels for the large-scale panel method of construction, comprising the following process steps:
   a) applying a hard foam panel to at least one flat table;
   b) disposing devices for reserving places in the form of frames for the production of openings and inner hollow chambers in accurately positioned relationship on the hard foam panel;
   c) spaced apart connecting members fixed by bonding agent to the remaining free surfaces of the hard foam panel;
   d) laying steel bars on to the hard foam panel;
   e) pouring and compacting a concrete layer on to the hard foam panel without any permanent support frame;
   f) stripping off the concrete layer to an accurate thickness dimension of the panel over the entire surface area and smoothing the surface; and
   g) removing the steel bars from the concrete layer prior to complete hardening of the concrete layer to produce hollow chambers adapted to receive reinforcing members.

28. A process as set forth in claim 27, wherein for process step d) coated steel bars are used.

* * * * *